United States Patent [19]
Burrows

[11] Patent Number: 6,047,981
[45] Date of Patent: Apr. 11, 2000

[54] SUPPORTING DEVICE FOR A BICYCLE WHEEL

[75] Inventor: Mike Burrows, Norwich, United Kingdom

[73] Assignee: Giant Manufacturing Co., Ltd., Taiwan

[21] Appl. No.: 09/027,335

[22] Filed: Feb. 20, 1998

[51] Int. Cl.[7] .................................................. B62K 25/08
[52] U.S. Cl. ............................................................ 280/276
[58] Field of Search .................................. 280/276, 277, 280/275, 283, 279

[56] References Cited

U.S. PATENT DOCUMENTS

| | | | |
|---|---|---|---|
| 2,756,070 | 7/1956 | Torre | 280/276 |
| 3,083,038 | 3/1963 | Moulton | 280/276 |
| 4,180,280 | 12/1979 | Doveri | 280/277 |
| 4,660,683 | 4/1987 | Hayashi et al. | 188/18 A |
| 5,156,231 | 10/1992 | Trema | 180/227 |
| 5,249,650 | 10/1993 | Tanaka | 188/344 |
| 5,308,099 | 5/1994 | Browning | 280/276 |
| 5,509,674 | 4/1996 | Browning | 280/276 |

*Primary Examiner*—Kevin Hurley
*Attorney, Agent, or Firm*—Harness, Dickey & Pierce, P.L.C.

[57] ABSTRACT

A supporting device for a bicycle wheel includes a bicycle frame, a single vertical support tube and restraining unit. The single vertical support tube has upper and lower sections telescoped to one another and a shock-absorbing unit disposed between the upper and lower sections. The upper section is connected to the bicycle frame. The lower section is adapted to carry the bicycle wheel. The restraining unit interconnects the upper and lower sections of the supporting tube and prevents the upper and lower sections of the support tube from rotating about an axis of the support tube with respect to one another.

1 Claim, 4 Drawing Sheets

SUPPORTING DEVICE FOR A BICYCLE WHEEL

BACKGROUND OF THE INVENTION

1. Field of the Invention

This invention relates to a supporting device, more particularly to a supporting device for a bicycle wheel.

2. Description of the Related Art

Referring to FIG. 1, a conventional supporting device for a bicycle front wheel 12 is shown to comprise a head tube 13 and a front fork 10 connected to a lower end of the head tube 13. The front fork 10 has a pair of fork blades 11 between which the front wheel 12 is rotatably disposed. Each of the fork blades 11 has upper and lower sections 111, 112 telescoped to one another, and shock-absorbing means (not shown) disposed between the upper and lower sections 111, 112.

The disadvantage of the conventional supporting device resides in that repair or replacement of the tire of the wheel 12 is relatively troublesome because detachment of the wheel 12 from the front fork 10 is required.

SUMMARY OF THE INVENTION

An object of the present invention is to provide a supporting device for a bicycle wheel in which the tire of the bicycle wheel can be repaired or replaced easily without the need for detaching the bicycle wheel from the supporting device.

According to the present invention, the supporting device for a bicycle wheel comprises a bicycle frame, a single vertical support tube and restraining means. The single vertical support tube has upper and lower sections telescoped to one another, and shock-absorbing means disposed between the upper and lower sections. The upper section is connected to the bicycle frame. The lower section is adapted to carry the bicycle wheel. The restraining means interconnects the upper and lower sections of the supporting tube for preventing the upper and lower sections of the support tube from rotating about an axis of the support tube with respect to one another.

BRIEF DESCRIPTION OF THE DRAWINGS

Other features and advantages of the present invention will become apparent in the following detailed description of a preferred embodiment of the invention, with reference to the accompanying drawings, in which.

DETAILED DESCRIPTION OF THE PREFERRED EMBODIMENT

Figure 1:
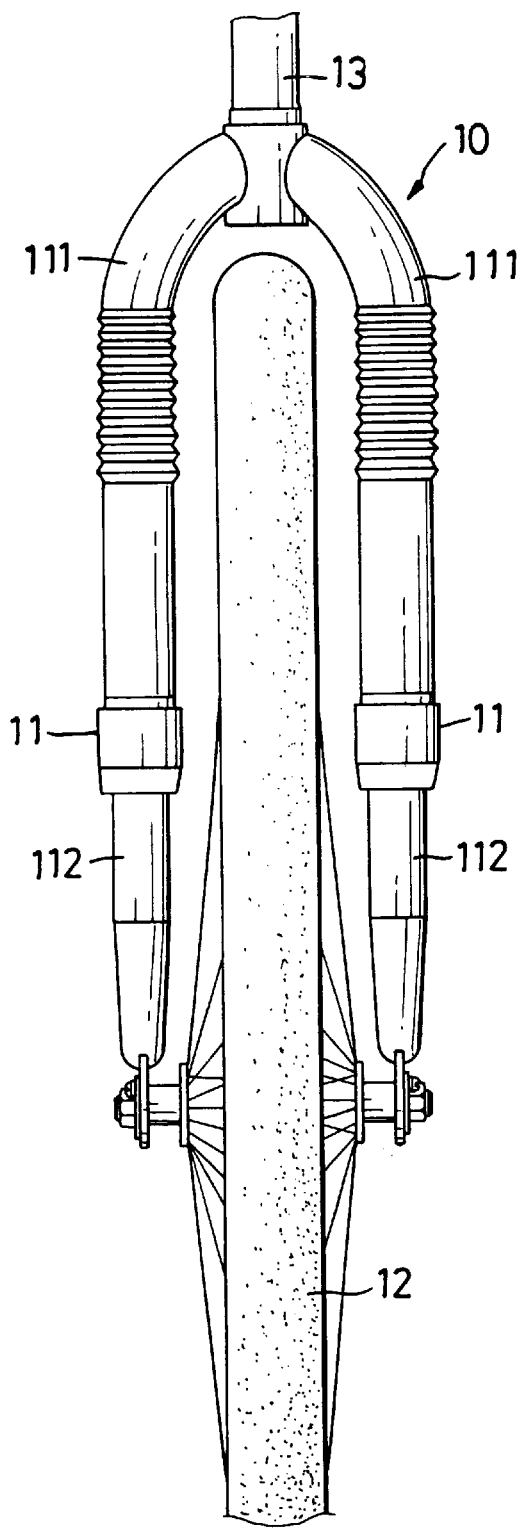
FIG. 1 is a fragmentary front view of a conventional supporting device for a bicycle front wheel.
Figure 2:
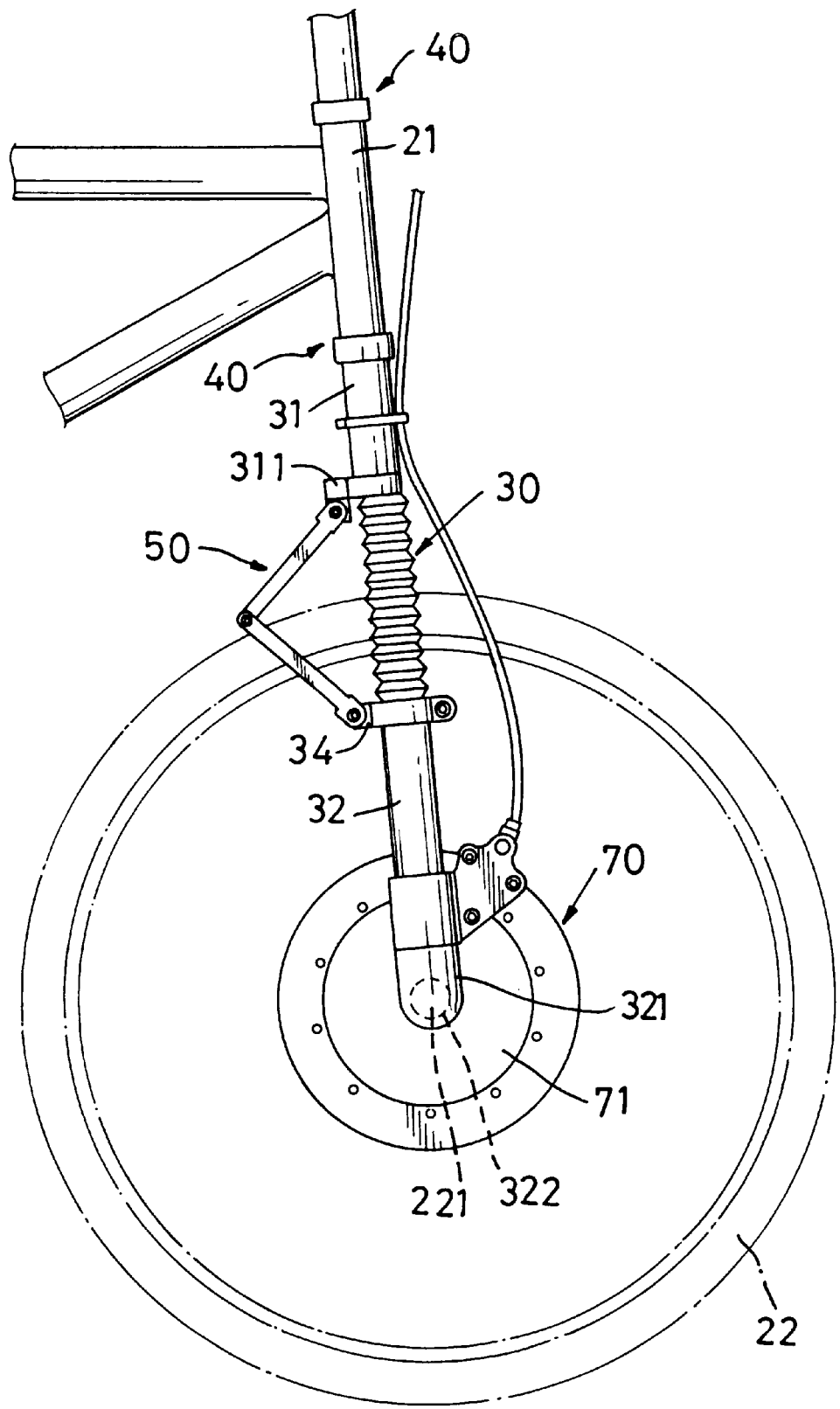
FIG. 2 is a fragmentary side view of a preferred embodiment of a supporting device for a bicycle wheel according to the present invention.
Figure 3:
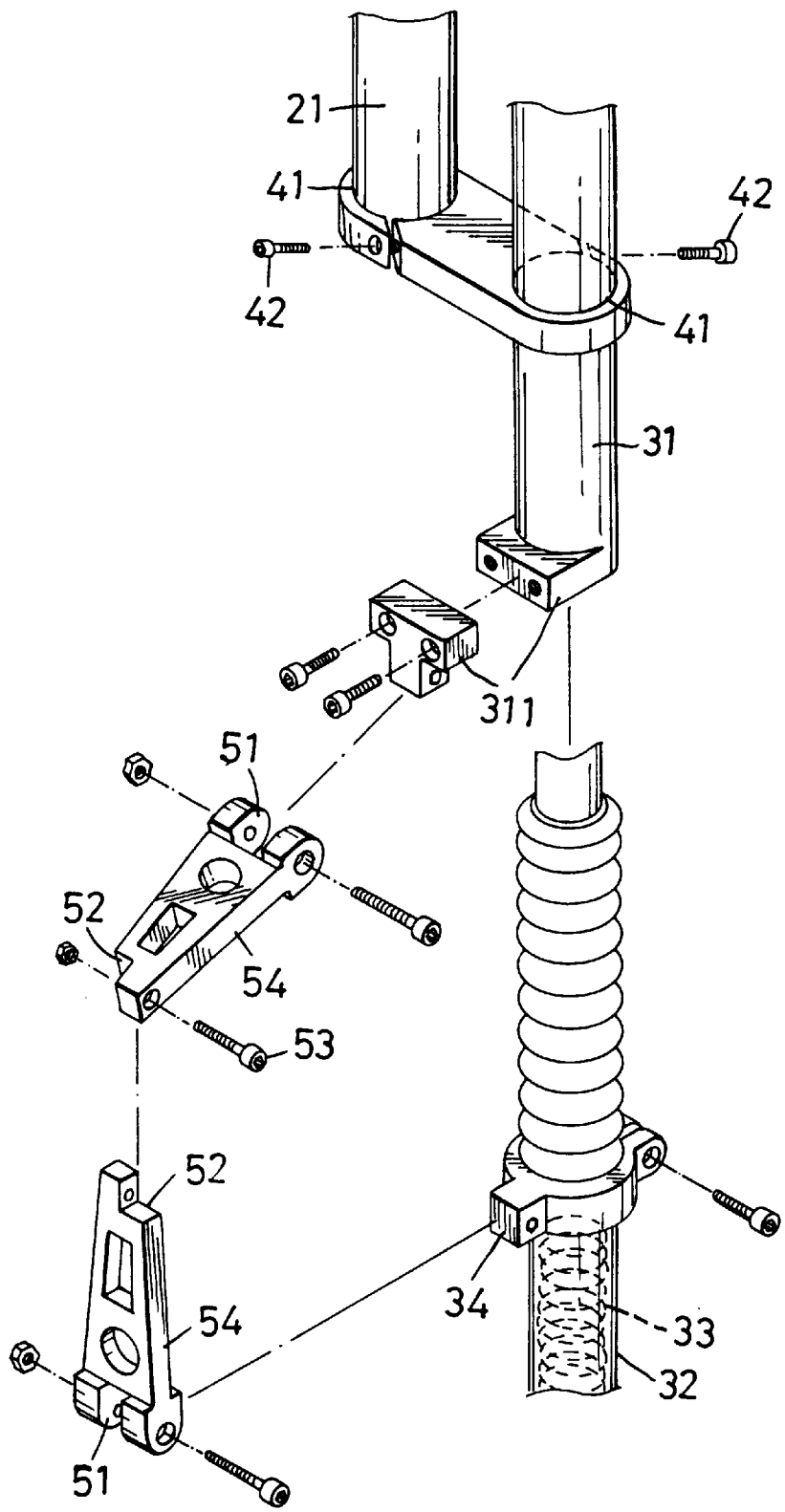
FIG. 3 is a partly exploded view of the preferred embodiment of the supporting device according to the present invention.
Figure 4:
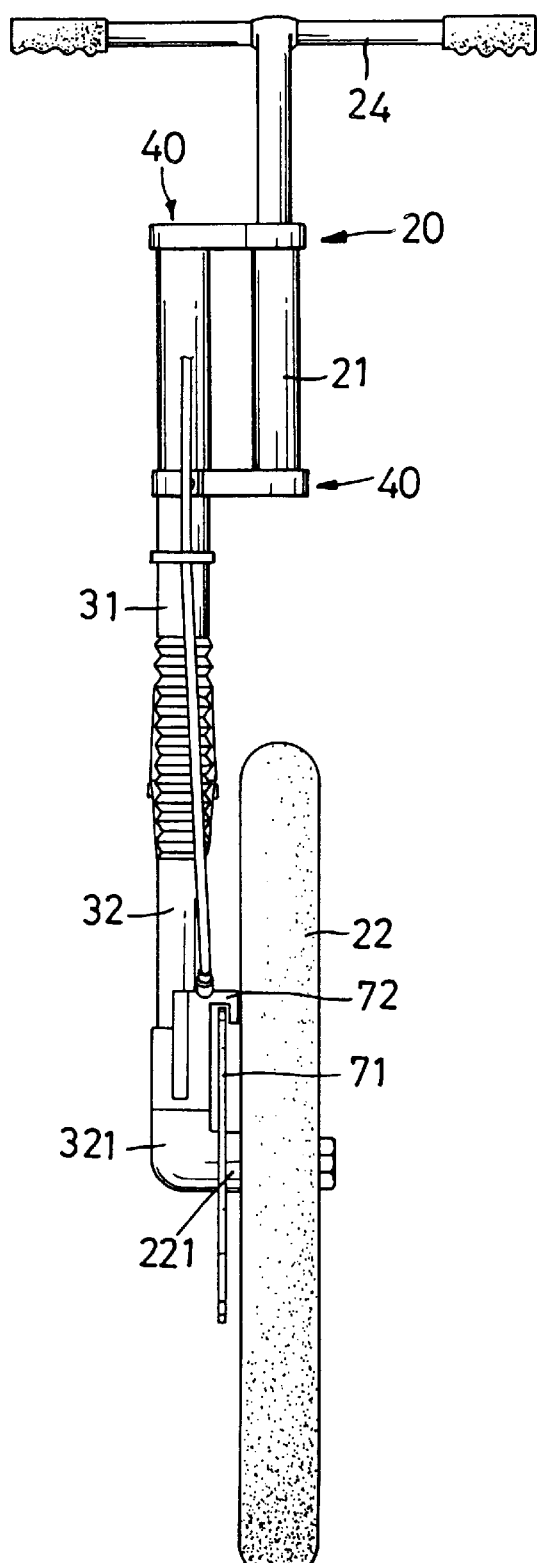
FIG. 4 is a front view of the preferred embodiment of the supporting device according to the present invention.

Referring to FIGS. 2, 3 and 4, a preferred embodiment of a supporting device for a bicycle wheel 22 in accordance with the present invention is shown to comprise a bicycle frame 20, a single vertical support tube 30 and restraining means 50.

The bicycle frame 20 has a head tube 21 and a handle bar mounted on the head tube 24. The single vertical support tube 30 has upper and lower sections 31, 32 telescoped to one another, and shock-absorbing means, such as, a compression spring 33, disposed between the upper and lower sections 31, 32. The upper section 31 is connected to the front tube 21. The lower section has a transversely extending bottom end 321 with a receiving bore 322 in which the axle 221 of the bicycle wheel 22 is retained rotatably in order to carry the same 22. The head tube 21 and the upper section 31 are connected to one another by two coupling plates 40 such that the support tube 30 is horizontally offset from the head tube 21 and such that the bicycle wheel 22 is located substantially in a vertical plane that is aligned with the head tube 21. More specifically, each of the coupling plates 40 has two C-shaped split rings 41 formed at two ends thereof. The upper section 31 and the head tube 31 extend through the split rings 41 and are secured to the same by means of screws 42.

The restraining means 50 interconnects the upper and lower sections 31, 32 of the supporting tube 30 and prevents the upper and lower sections 31, 32 from rotating about an axis of the support tube 30 with respect to one another. In this embodiment, the restraining means 50 includes a pair of arm members 54. Each of the arm members 54 has a first end 51 connected pivotally to a respective one of the upper and lower sections 31, 32, and a second end 52. The lower end of the upper section 31 has a first horizontally projecting pivot seat 311 to which the first end 51 of one of the arm members 54 is pivotally connected. The upper end of the lower section 32 has a second horizontally projecting pivot seat 34 to which the first end 51 of the other one of the arm members 54 is pivotally connected. The first and second pivot seats 311, 34 are aligned vertically. The second ends 52 of the arm members 54 are connected pivotally to one another by bolt members 53 for turning about a horizontal axis so as to move the arm members 54 toward and away from one another along a vertical direction.

With the above mentioned arrangement, the tire of the bicycle wheel 22 can be detached from the bicycle wheel 22 for repairing or replacement purposes without the need for detaching the bicycle wheel 22 from the support tube 30. The object of the present invention is thus met.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A supporting device for a bicycle wheel, comprising:

a bicycle frame, said bicycle frame having a head tube and a handle bar mounted to said head tube;

single vertical support tube having upper and lower sections telescoped to one another, and shock-absorbing means disposed between said upper and lower sections, said upper section being connected to said bicycle frame, said lower section being adapted to carry said bicycle wheel;

said support tube being horizontally offset from said head tube, said upper section being connected to said head tube, said lower section having a bottom end which is adapted to hold said bicycle wheel substantially in a vertical plane that is aligned with said head tube;

restraining means interconnecting said upper and lower sections of said supporting tube for preventing said upper and lower sections of said support tube from rotating abut an axis of said support tube with respect to one another;

said restraining means including a pair of arm members, each of said arm members having a first end connected pivotally to a respective one of said upper and lower sections, and a second end, said second ends of said arm members being connected pivotally to one another for turning about a horizontal axis so as to move said arm members toward and away from one another along a vertical direction.

* * * * *